(12) United States Patent
Jung

(10) Patent No.: US 7,847,909 B2
(45) Date of Patent: Dec. 7, 2010

(54) LIQUID CRYSTAL DISPLAY DEVICE HAVING PARTICULAR DUMMY PATTERN

(75) Inventor: Myoung-hoon Jung, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 436 days.

(21) Appl. No.: 12/076,400

(22) Filed: Mar. 18, 2008

(65) Prior Publication Data

US 2008/0246909 A1 Oct. 9, 2008

(30) Foreign Application Priority Data

Apr. 3, 2007 (KR) ..................... 10-2007-0032863

(51) Int. Cl.
G02F 1/1345 (2006.01)
G02F 1/1343 (2006.01)

(52) U.S. Cl. ..................... 349/149; 349/151; 349/152; 349/139

(58) Field of Classification Search .................. 349/149, 349/151, 152, 139
See application file for complete search history.

(56) References Cited

U.S. PATENT DOCUMENTS 6,476,897 B1 * 11/2002 Watanabe et al. ............ 349/139
6,774,968 B2 * 8/2004 Hagiwara .................... 349/139
6,922,226 B2 * 7/2005 Park et al. .................... 349/149

FOREIGN PATENT DOCUMENTS

JP 10-142613 5/1998
JP 11-186343 7/1999
KR 10-2001-0094809 A 11/2001

* cited by examiner

*Primary Examiner*—Mike Qi
(74) *Attorney, Agent, or Firm*—Lee & Morse, P.C.

(57) ABSTRACT

A liquid crystal display (LCD) device includes lower and upper substrates attached to each other, a plurality of data lines on the lower substrate, a plurality of lead lines on the lower substrate, the lead lines being positioned in a dummy region of the lower substrate, a plurality of scan lines on the upper substrate, the scan lines being connected to respective lead lines and being positioned to intersect with the data lines, and at least one dummy pattern on the lower substrate, the dummy pattern being positioned in the dummy region between an edge of the lower substrate and a corresponding outermost lead line of the plurality of lead lines.

17 Claims, 4 Drawing Sheets

LIQUID CRYSTAL DISPLAY DEVICE HAVING PARTICULAR DUMMY PATTERN

BACKGROUND OF THE INVENTION

1. Field of the Invention

Embodiments of the present invention relate to a liquid crystal display (LCD) device. More particularly, embodiments of the present invention relate to a LCD device having signal lines with increased resistance uniformity.

2. Description of the Related Art

Flat panel display devices may display images on flat screens, and may have reduced weight and volume, as compared to, e.g., a cathode ray tube (CRT) display. Examples of flat panel display devices may include LCD device, a field emission display (FED) device, a plasma display panel (PDP) device, an organic light emitting display device, and so forth. For example, a conventional LCD device, e.g., a passive matrix type LCD device, may use low power, and may be employed in portable apparatuses, e.g., cellular phones, personal digital assistants (PDAs), and so forth, and/or stationary apparatuses, e.g., television (TV) monitors, and so froth.

In particular, the conventional LCD device may include liquid crystals between two substrates, and intersecting data and scan lines. The liquid crystals may be positioned at intersection points of the data and scan lines, so application of voltage to the liquid crystals may align the liquid crystals to transmit light and to form images. The data lines may transmit signals through lead lines.

The data and lead lines of the conventional LCD device may be formed on a same substrate by patterning a conductive layer via, e.g., etching. During etching, however, an etching rate in peripheral portions of the substrate may be faster than in central portions of the substrate, so an outermost lead line, i.e., a lead line positioned closest to an edge of the substrate, may be excessively etched. Excessive etching of the outermost lead line may increase resistance thereof, as compared to other lead lines, so resistance of the lead lines may be non-uniform. Non-uniform resistance of the lead lines may cause non-uniform brightness in pixels, so image quality of the LCD device may be deteriorated.

SUMMARY OF THE INVENTION

Embodiments of the present invention are therefore directed to a LCD device, which substantially overcomes one or more of the disadvantages and shortcomings of the related art.

It is therefore a feature of an embodiment of the present invention to provide a LCD device having signal lines with increased resistance uniformity.

At least one of the above and other features and advantages of the present invention may be realized by providing a LCD device, including lower and upper substrates attached to each other, a plurality of data lines on the lower substrate, a plurality of lead lines on the lower substrate, the lead lines being positioned in a dummy region of the lower substrate, a plurality of scan lines on the upper substrate, the scan lines being connected to respective lead lines and being positioned to intersect with the data lines, and at least one dummy pattern on the lower substrate, the dummy pattern being positioned in the dummy region between an edge of the lower substrate and a corresponding outermost lead line of the plurality of lead lines.

The dummy pattern may extend along the lead lines. The dummy pattern may extend along an entire length of the outermost lead line of the plurality of lead lines. The LCD may further include a driving circuit unit on the lower substrate, the driving circuit unit being electrically connected to the data lines and to the lead lines. The driving circuit unit may include at least two scan drivers, and the lead lines may be electrically connected to any one of the scan drivers. The dummy pattern may extend along an entire length of the outermost lead line, the outermost lead line being connected between the scan driver and a respective scan line. The dummy pattern may be electrically insulated. The dummy pattern may be spaced apart from the outermost lead line. An interval between the dummy pattern and the outermost lead line may substantially equal an interval between adjacent lead lines. The dummy pattern may be spaced apart from the driving circuit unit.

At least two dummy patterns may be positioned on the lower substrate, the dummy patterns being positioned along different sides of the lower substrate. Each of the dummy patterns may be between a respective edge of the lower substrate and a corresponding outermost lead line. The dummy patterns may be arranged to surround all the outermost lead lines on the lower substrate. The dummy pattern may include substantially same materials as the data lines and the lead lines. The dummy pattern, the data lines, and the lead lines may include indium-tin-oxide. The LCD may further include a plurality of pixels at intersections of the data lines and the scan lines. The dummy pattern may be directly between an edge of the lower substrate and the outermost lead line.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
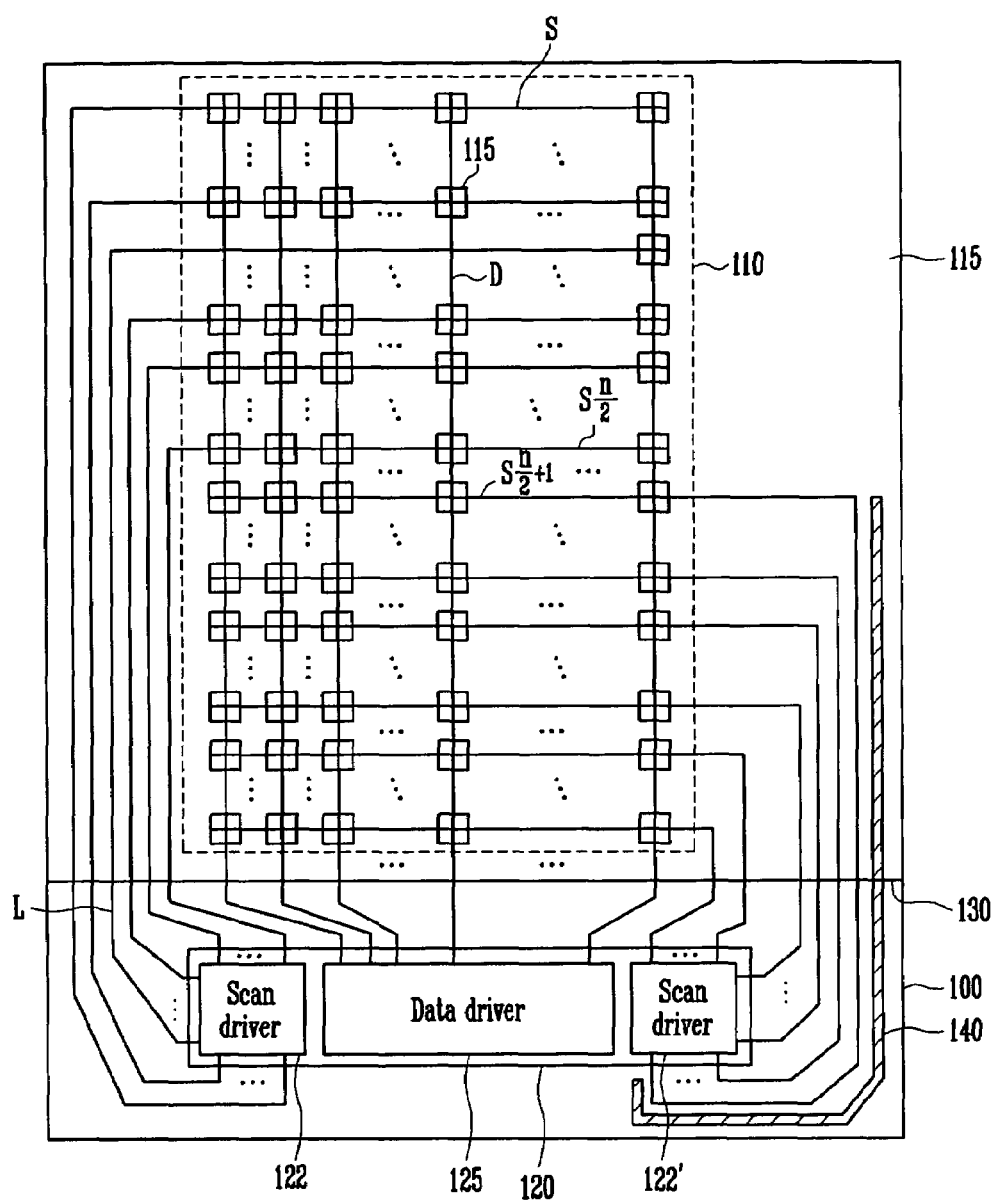
FIG. 1 illustrates a schematic view of a LCD device according to an embodiment of the present invention.

Korea Patent Application No. 10-2007-0032863, filed on Apr. 3, 2007, in the Korean Intellectual Property Office, and entitled: "Liquid Crystal Display Device," is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or an element is referred to as being "on" another layer, element, or substrate, it can be directly on the other layer, element or substrate, or intervening layers and/or elements may also be present. In addition, it will also be understood that when a layer or an element is referred to as being "between" two layers or elements, it can be the only layer or element between the two layers or elements, or one or more intervening layers and/or elements may also be present. Like reference numerals refer to like elements throughout.

Figure 2:
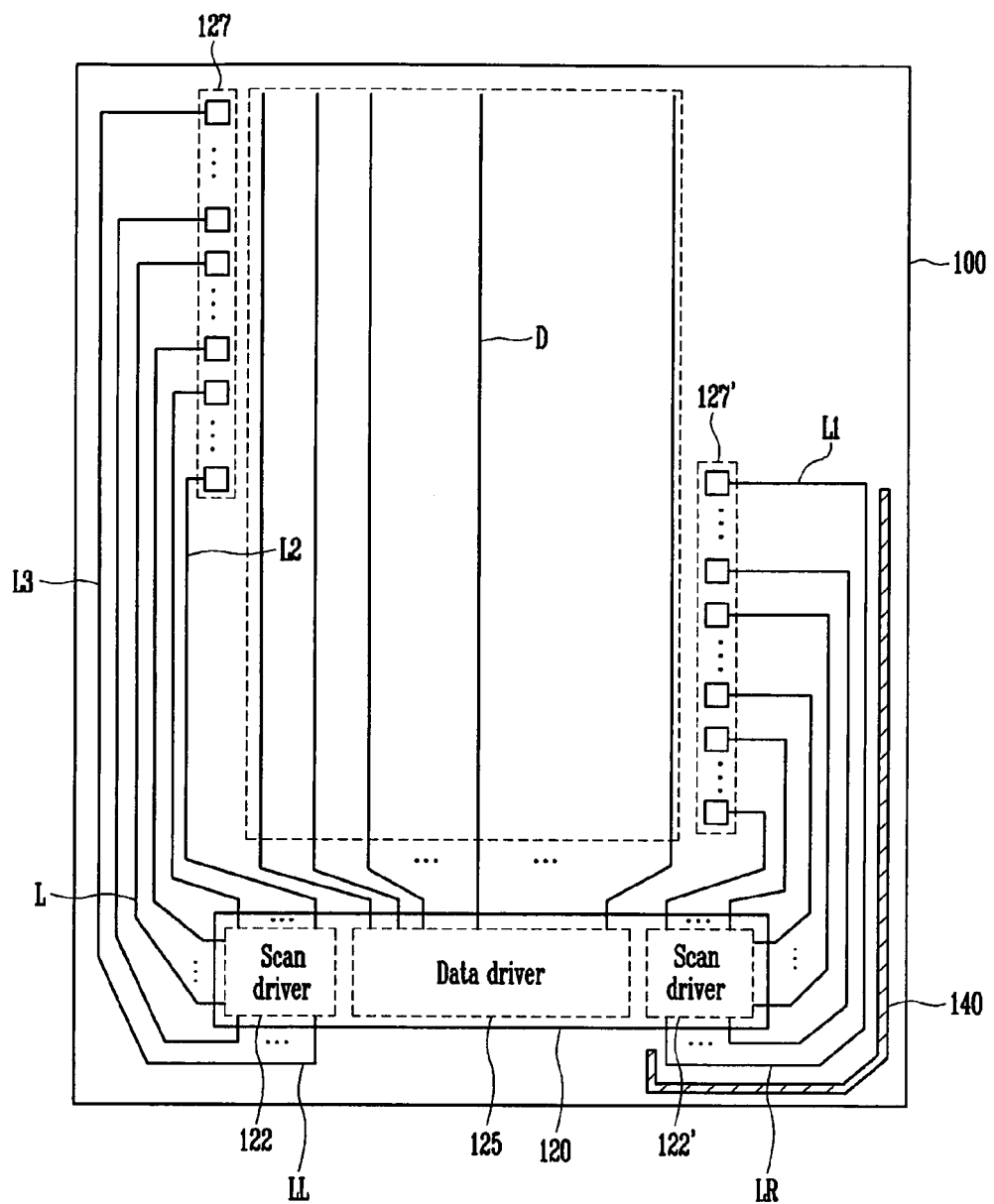
FIG. 2 illustrates a lower substrate of the LCD device of FIG. 1.
Figure 3:
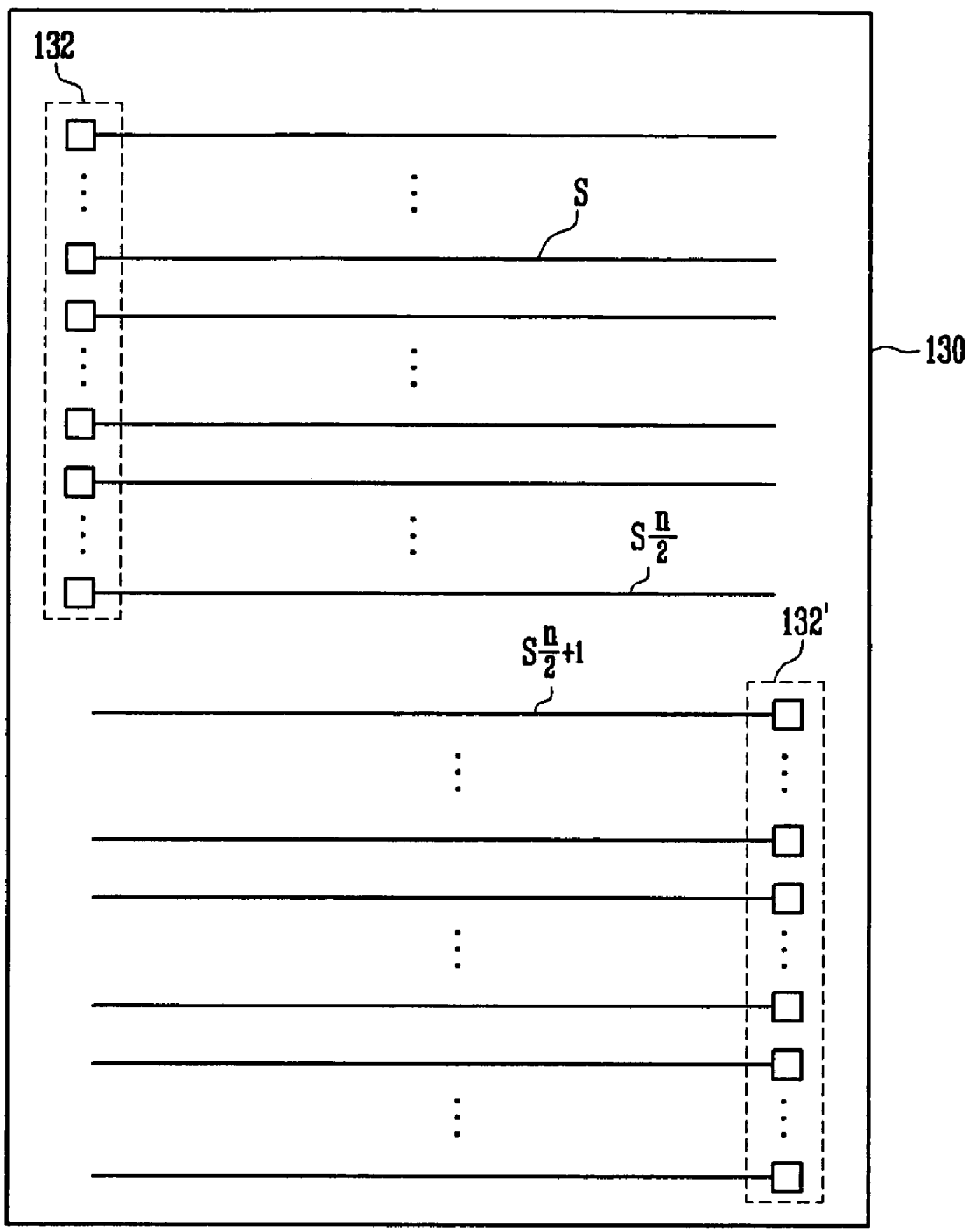
FIG. 3 illustrates an upper substrate of the LCD device of FIG. 1.

FIG. 1 illustrates a schematic view of a LCD device according to an embodiment of the present invention, and FIGS. 2-3 illustrate schematic views of lower and upper substrates, respectively, of the LCD of FIG. 1. It is noted that even though FIGS. 1-3 illustrate a passive matrix type LCD device, other LCD types, e.g., an active matrix type LCD, are within the scope of the present invention.

Referring to FIGS. 1-3, a LCD may include lower and upper substrates 100 and 130 with liquid crystals (not shown) therebetween, a plurality of scan lines S, data lines D, and lead lines L between the lower and upper substrates 100 and 130, a driving circuit unit 120, and at least one dummy pattern 140. The lower and upper substrates 100 and 130 may be bonded to each other.

The data lines D and lead lines L may be formed on the lower substrate 100, e.g., on a surface facing the upper substrate 130. The scan lines S may be formed on the upper substrate 130, e.g., on a surface facing the lower substrate 100, and may intersect with the data lines D. The liquid crystals may be positioned between the data lines D and the scan lines S, so pixels 115 may be formed at intersection points of the data lines D and the scan lines S. As illustrated in FIG. 1, a region including the pixels 115, i.e., a display region 110, may form images.

The driving circuit unit 120 of the LCD device may include at least one scan driver 122 and a data driver 125. The scan driver 122 may be connected to the lead lines L to supply scan signals thereto, and the data driver 125 may be connected to the data lines D to supply data signals thereto. For example, as illustrated in FIG. 1, one scan driver 122 may be mounted on one side of the data driver 125, and another scan driver 122' may be mounted on another side of the data driver 125. Use of two scan drivers 122 on opposite sides of the lower substrate 100 may facilitate formation and design of the lead lines L in a predetermined space. For example, as illustrated in FIG. 1, lead lines L may be divided into two groups positioned on opposite sides of the lower substrate 100, e.g., a group of lead lines $L_L$ on a left portion of the substrate 100 and a group of lead lines $L_R$ on a right portion of the substrate 100. Accordingly, lead lines $L_L$ may be connected to scan driver 122, and lead lines $L_R$ may be connected to another scan driver 122'.

The scan lines S may be formed on the upper substrate 130, and may be connected to respective lead lines L via pads. More specifically, as illustrated in FIG. 2, pad units 127 may be formed on the lower substrate 100, so the lead lines L may be connected thereto. As illustrated in FIG. 3, pad units 132 may be formed on the upper substrate 130, so the scan lines S may be connected thereto. The pads units 127 and the pad units 132 may be connected to each other. When the scan drivers 122 supply scan signals to the lead lines L, the scan signals may be transmitted to the scan lines S via the pad units 127 and the pad units 132. When scan driver 122 and scan driver 122' are used, pad units 127' and pad units 132' may be added, so each group of lead lines L may be easily connected in its respective portion of the lower substrate 100. The scan signals select pixels 115 to be operated, so the selected pixels 115 may change transmittance of light therethrough, i.e., light supplied from a backlight unit (not shown), in accordance with data signals supplied from the data lines D to display an image in the display region 110.

The dummy pattern 140 of the LCD may be formed on the lower substrate 100. More specifically, the dummy pattern 140 may extend along a portion of an edge of the substrate 100 and in close proximity thereto, so the dummy pattern 140 may be between the edge of the substrate 100 and the lead lines L, as illustrated in FIG. 2. For example, as illustrated in FIGS. 1-2, the dummy pattern 140 may be formed between an edge of the lower substrate 100 and a respective outermost lead line L1, e.g., a lead line positioned closest to the right edge of the lower substrate 100 and electrically connecting the n/2+1 scan line $S_{n/2+1}$ to the scan driver 122'. The dummy pattern 140 may surround the outermost lead line L1, i.e., extend along an entire length of the outermost lead line L1 to separate the outermost lead line L1 from the edge of the lower substrate 100. For example, as illustrated in FIG. 1, the dummy pattern 140 may include curved portions, e.g., extend along a portion of one edge of the lower substrate 100 and continuously extend along an adjacent edge of the lower substrate 100, to provide a barrier between the edge of the lower substrate 100 and a respective outermost lead line L1.

The dummy pattern 140 and the lead lines L may be formed in a dummy region 115 of the lower substrate 100, i.e., a peripheral region of the lower substrate 100 surrounding the display region 110. Even though FIG. 1 illustrates the dummy pattern 140 in a lower right corner of the lower substrate 100, other configurations of the dummy pattern 140 are within the scope of the present invention. For example, the dummy pattern 140 may be formed in a left portion of the lower substrate 100, i.e., between a left edge of the lower substrate 100 and its corresponding outermost lead line L3. It is noted that each of lead lines L1 and L3 may be an outermost lead line with respect to different edges of the lower substrate 100. An innermost lead line L2 may be positioned far from the left edge of the lower substrate 100.

The dummy pattern 140 may be formed of a substantially same material in a substantially same process as the data lines D and the lead lines L. More specifically, a conductive film, e.g., an indium-tin-oxide (ITO) layer, may be deposited on the lower substrate 100. Next, a photoresist layer may be deposited on the conductive film, followed by a soft-baking process. Next, the photoresist layer may be patterned, i.e., patterns corresponding to the signal lines to be formed, by performing exposing and developing processes, followed by a hard-baking process. Then, the conductive film may be patterned through the patterned photoresist layer by applying an etchant, e.g., spraying, to form the data lines D, lead lines L, and dummy pattern 140. Accordingly, the data lines D, lead lines L, and dummy pattern 140 may be formed simultaneously. Remaining portions of the photoresist layer may be removed, e.g., by a strip process, from the data lines D, lead lines L, and dummy pattern 140.

The dummy pattern 140 may operate as an etch shield to the lead lines L, so signals may not be transmitted therethrough. Accordingly, the dummy pattern 140 may be electrically insulated from other components of the LCD. For example, the dummy pattern 140 may be spaced apart from the driving circuit unit 120 and from the outermost lead line L1. An interval between the dummy pattern 140 and the outermost lead line L1 may substantially equal an interval between two adjacent lead lines L.

According to an embodiment of the present invention, at least one dummy pattern 140 in a dummy region 115 of the lower substrate 100 may prevent or substantially minimize excessive etching of an outermost lead lines L, so uniformity of resistance of the lead lines L may be increased. In particular, since the dummy pattern 140 may be positioned along an edge of the lower substrate 100, i.e., as an outermost pattern, the dummy pattern 140 may shield the outermost lead line L1 from excessive etching. In other words, even if etching rate is faster along the edge of the lower substrate 100 than in inner portions of the lower substrate 100, positioning of the dummy patter 140 between the edge of the lower substrate 100 and the outermost lead line L1 may shield any excessive etching, so the outermost lead line L1 may be etched at a substantially same rate as all the lead lines L. As such, the lead lines L may have a substantially uniform resistance, so deterioration of image quality of the LCD device may be prevented or substantially minimized.

Figure 4:
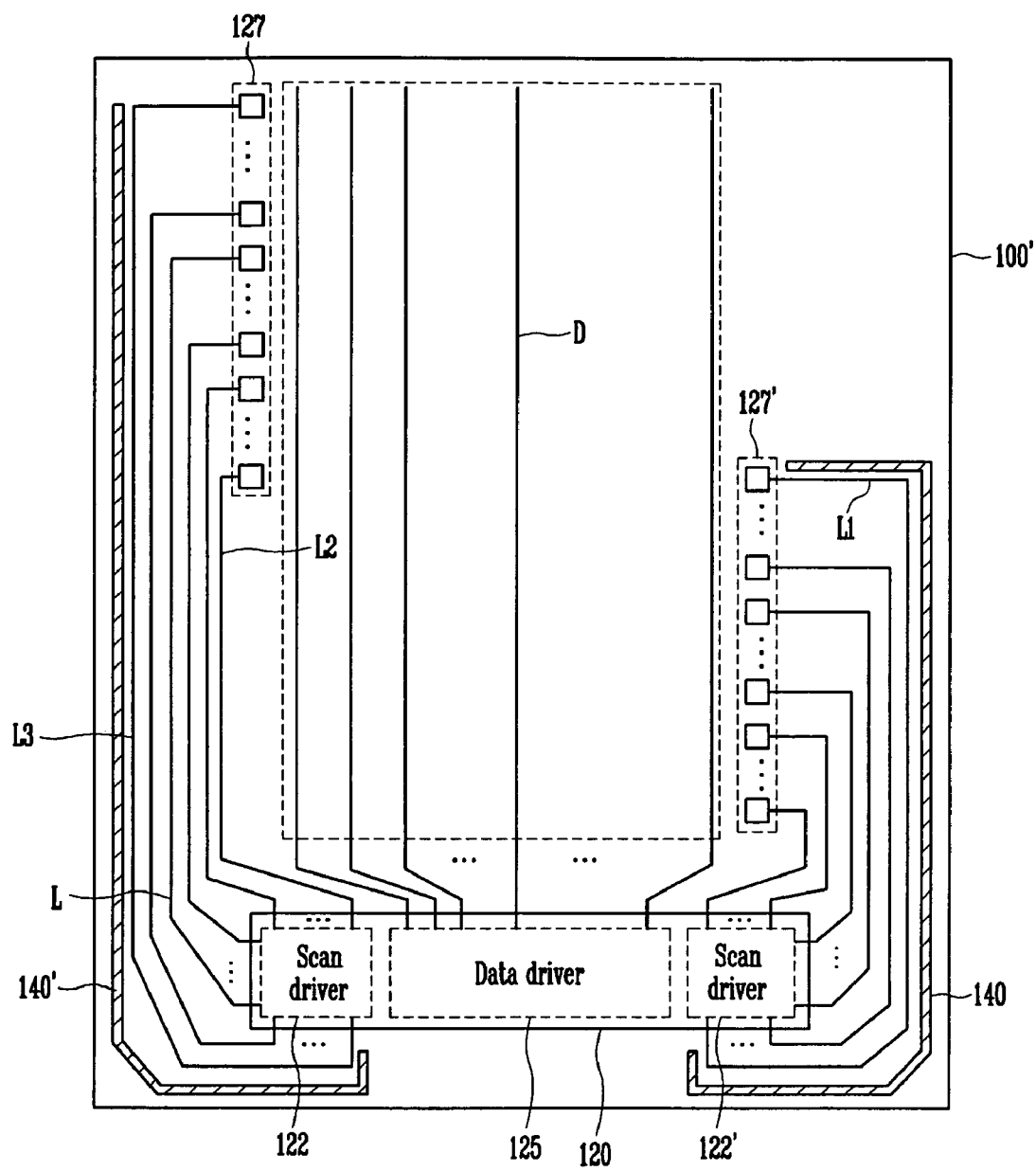
FIG. 4 illustrates a schematic view of a lower substrate of a LCD according to another embodiment of the present invention.

According to another embodiment of the present invention, a plurality of dummy patterns 140 may be formed on the lower substrate 100 in order to more efficiently prevent or substantially minimize excessive etching of outermost lead lines. For example, as illustrated in FIG. 4, a dummy pattern 140' may be formed on the lower substrate 100 opposite the dummy pattern 140, so an outermost lead line L3 opposite the outermost lead line L1 may be shielded from excessive etching. Accordingly, resistance uniformity of the lead lines L may be further improved, thereby enhancing image quality.

A LCD device according to embodiments of the present invention may have improved resistance uniformity between signal lines, so image quality may be improved. In other words, the dummy pattern of the LCD device may shield the lead lines from excessive etching, so difference of etching rates among the lead lines may be reduced. Accordingly, deterioration of the image quality due to resistance difference between the lead lines may be prevented or substantially minimized.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display (LCD) device, comprising:
lower and upper substrates attached to each other;
a plurality of data lines on the lower substrate;
a plurality of lead lines on the lower substrate, the lead lines being positioned in a dummy region of the lower substrate;
a plurality of scan lines on the upper substrate, the scan lines being connected to respective lead lines and being positioned to intersect with the data lines; and
at least one dummy pattern on the lower substrate, the dummy pattern being positioned in the dummy region between an edge of the lower substrate and a corresponding outermost lead line of the plurality of lead lines.

2. The LCD device as claimed in claim 1, wherein the dummy pattern extends along the lead lines.

3. The LCD device as claimed in claim 2, wherein the dummy pattern extends along an entire length of the outermost lead line of the plurality of lead lines.

4. The LCD device as claimed in claim 1, further including a driving circuit unit on the lower substrate, the driving circuit unit being electrically connected to the data lines and to the lead lines.

5. The LCD device as claimed in claim 4, wherein the driving circuit unit includes at least two scan drivers, and the lead lines are electrically connected to any one of the scan drivers.

6. The LCD device as claimed in claim 5, wherein the dummy pattern extends along an entire length of the outermost lead line, the outermost lead line being connected between the scan driver and a respective scan line.

7. The LCD device as claimed in claim 4, wherein the dummy pattern is electrically insulated.

8. The LCD device as claimed in claim 7, wherein the dummy pattern is spaced apart from the outermost lead line.

9. The LCD device as claimed in claim 8, wherein an interval between the dummy pattern and the outermost lead line substantially equals an interval between adjacent lead lines.

10. The LCD device as claimed in claim 7, wherein the dummy pattern is spaced apart from the driving circuit unit.

11. The LCD device as claimed in claim 1, wherein at least two dummy patterns are positioned on the lower substrate, the dummy patterns being positioned along different sides of the lower substrate.

12. The LCD device as claimed in claim 11, wherein each of the dummy patterns is between a respective edge of the lower substrate and a corresponding outermost lead line.

13. The LCD device as claimed in claim 12, wherein the dummy patterns are arranged to surround all the outermost lead lines on the lower substrate.

14. The LCD device as claimed in claim 1, wherein the dummy pattern includes substantially same materials as the data lines and the lead lines.

15. The LCD device as claimed in claim 14, wherein the dummy pattern, the data lines, and the lead lines include indium-tin-oxide.

16. The LCD device as claimed in claim 1, further comprising a plurality of pixels at intersections of the data lines and the scan lines.

17. The LCD device as claimed in claim 1, wherein the dummy pattern is directly between an edge of the lower substrate and the outermost lead line.

* * * * *